United States Patent [19]

Wagner

[11] Patent Number: 5,374,209
[45] Date of Patent: Dec. 20, 1994

[54] INTERNAL COMBUSTION ENGINE EXHAUST SYSTEM

[76] Inventor: Jeffrey F. Wagner, 3924 Woodlawn Dr., Gurnee, Ill. 60031

[21] Appl. No.: 8,841

[22] Filed: Jan. 25, 1993

Related U.S. Application Data

[63] Continuation of Ser. No. 788,555, Nov. 6, 1991, abandoned.

[51] Int. Cl.5 ............................................. B63H 21/32
[52] U.S. Cl. .................................... 440/88; 440/900; 181/235; 181/269; 60/323
[58] Field of Search ............... 440/88, 89, 900; 181/198, 212, 217, 222, 228, 235, 238–240, 247–251, 255, 264, 269–275; 60/281, 272, 323, 324

[56] References Cited

U.S. PATENT DOCUMENTS

| | | | |
|---|---|---|---|
| 3,020,707 | 2/1962 | Post et al. | 60/31 |
| 3,692,006 | 9/1972 | Miller et al. | 123/55 |
| 3,969,893 | 7/1976 | Sakurai et al. | 60/282 |
| 3,994,129 | 11/1976 | Sakurai et al. | 60/298 |
| 4,034,561 | 7/1977 | Sakurai et al. | 60/282 |
| 4,092,958 | 6/1978 | Hale | 123/73 |
| 4,165,720 | 8/1979 | Barcak | 123/41.31 |
| 4,184,462 | 1/1980 | Hale | 123/55 |
| 4,187,809 | 2/1980 | Lanpheer et al. | 123/65 |
| 4,381,644 | 5/1983 | Kusche | 60/313 |
| 4,484,442 | 11/1984 | Hale | 60/313 |
| 4,559,908 | 12/1985 | Flaig et al. | 123/41.28 |
| 4,589,852 | 5/1986 | Price | 440/89 |
| 4,702,202 | 10/1987 | Hensel et al. | 123/52 |
| 4,799,905 | 1/1989 | Broughton et al. | 440/89 |
| 4,906,214 | 3/1990 | Towner | 440/89 |
| 4,914,911 | 4/1990 | Bertram | 440/89 |
| 4,940,435 | 7/1990 | Osborn et al. | 440/89 |
| 4,951,465 | 8/1990 | Torigai | 440/89 |
| 4,955,838 | 9/1990 | Wenstadt | 440/89 |
| 4,963,110 | 10/1990 | Otani | 440/88 |
| 5,022,877 | 6/1991 | Harbert | 440/89 |
| 5,046,977 | 9/1991 | Rodskier | 440/89 |

Primary Examiner—Robert J. Oberleitner
Assistant Examiner—Clifford T. Bartz

[57] ABSTRACT

An outboard motor comprising a propulsion unit including a propeller shaft, and an internal combustion engine drivingly connected to the propeller shaft and including a V-shaped cylinder block having first and second cylinder banks including respective first and second cylinders having respective first and second exhaust ports, and the cylinder block defining an exhaust chamber communicating with the exhaust ports, a cowling surrounding the engine and including an upper portion and a lower portion, a muffler located between the cylinder banks and including an inner cover portion which has therein an exhaust inlet communicating with the exhaust chamber and which engages the cylinder block, an outer cover portion, and a main cover portion which is located between the inner and outer cover portions and which defines an exhaust outlet and an expansion chamber communicating between the exhaust inlet and the exhaust outlet, and an exhaust conduit extending through the lower cowling portion and communicating between the exhaust outlet and the atmosphere.

17 Claims, 4 Drawing Sheets

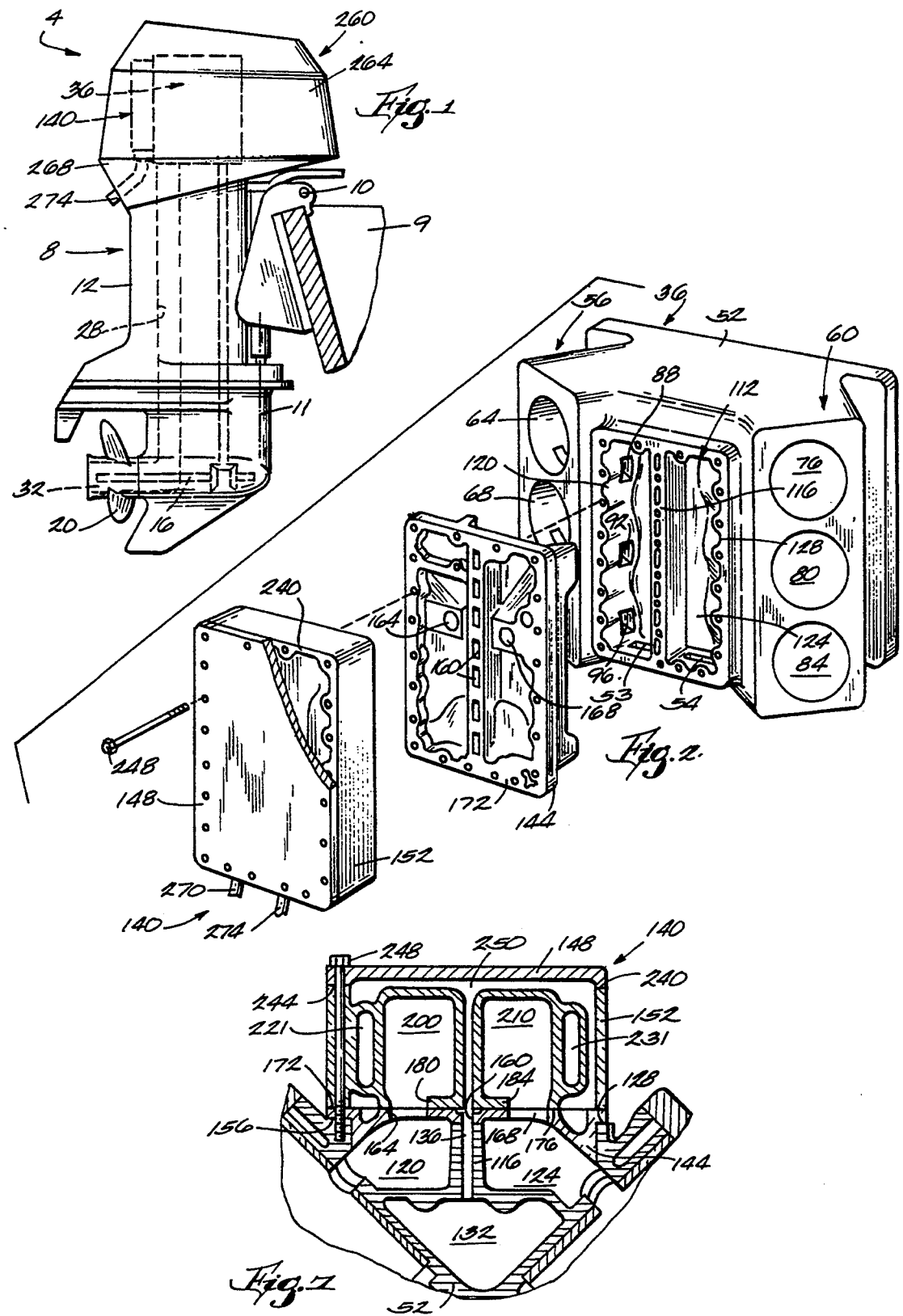

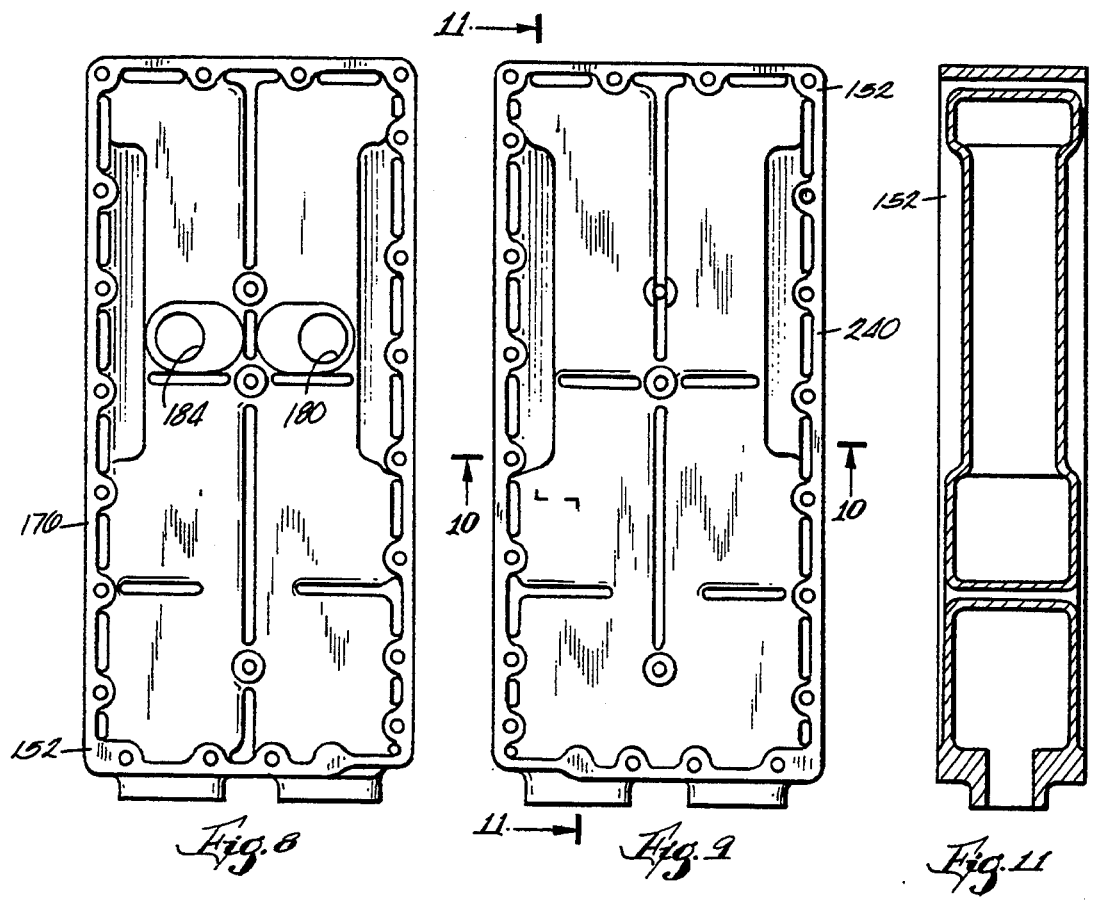
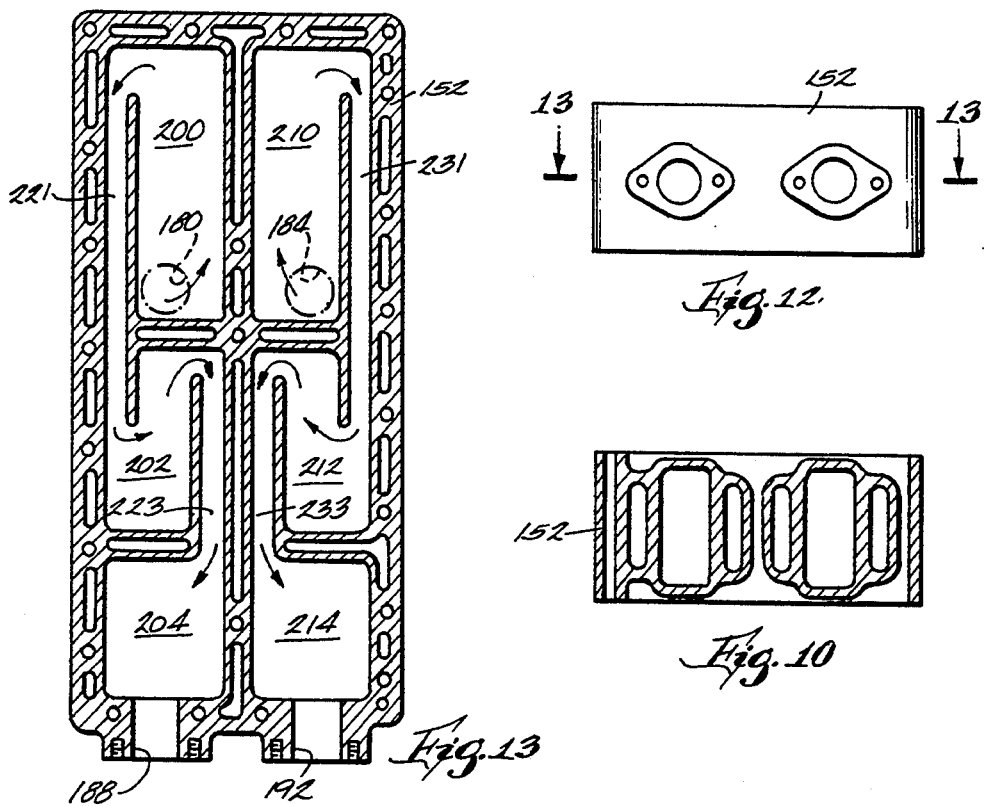

INTERNAL COMBUSTION ENGINE EXHAUST SYSTEM

This application is a continuation of Ser. No. 07/788,555, filed Nov. 6, 1991, now abandoned.

BACKGROUND OF THE INVENTION

1. Field of the Invention

This invention relates to internal combustion engines, and particularly to exhaust systems for outboard motor internal combustion engines.

2. Description of the Prior Art

A typical outboard motor exhaust gas system includes an exhaust conduit structure which communicates with all of the exhaust ports and discharges the exhaust gases from the exhaust ports into the driveshaft housing. The exhaust gases travel through the driveshaft housing and exit through the propeller.

Exhaust relief systems have also been provided for venting the exhaust gases through a discharge outlet located above the water when the engine is operating at relatively low speeds.

Attention is directed to the following United States Patents:

| U.S. Pat. No. | Inventor | Issued |
| --- | --- | --- |
| 3,020,707 | Post et al. | February 13, 1962 |
| 3,692,006 | Miller et al. | September 19, 1972 |
| 3,969,893 | Sakurai et al. | July 20, 1976 |
| 3,994,129 | Sakurai et al. | November 30, 1976 |
| 4,034,561 | Sakurai et al. | July 12, 1977 |
| 4,092,958 | Hale | June 6, 1978 |
| 4,165,720 | Barcak | August 28, 1979 |
| 4,184,462 | Hale | January 22, 1980 |
| 4,187,809 | Lanpheer et al. | February 12, 1980 |
| 4,381,644 | Kusche | May 3, 1983 |
| 4,484,442 | Hale | November 27, 1984 |
| 4,559,908 | Flaig et al. | December 24, 1985 |
| 4,702,202 | Hensel et al. | October 27, 1987 |
| 4,799,905 | Broughton et al. | January 24, 1989 |
| 4,906,214 | Towner | March 6, 1990 |
| 4,940,435 | Osborn et al. | July 10, 1990 |
| 4,955,838 | Wenstadt | September 11, 1990 |

SUMMARY OF THE INVENTION

The invention provides an outboard motor comprising a propulsion unit including a propeller shaft, and an internal combustion engine drivingly connected to the propeller shaft and including a V-shaped cylinder block having first and second cylinder banks including respective first and second cylinders having respective first and second exhaust ports, and exhaust means located between the cylinder banks and including a housing defining an exhaust inlet communicating with the exhaust ports, an exhaust outlet communicating with the atmosphere, and an expansion chamber communicating between the inlet and the outlet.

One embodiment of the invention provides an outboard motor comprising a driveshaft housing, a propeller shaft supported by the driveshaft housing, an internal combustion engine drivingly connected to the propeller shaft and including a cylinder block which has a lower end supported by the driveshaft housing and which defines a cylinder having an exhaust port, and a muffler communicating with the exhaust port and including an inner cover portion which has therein an exhaust inlet communicating with the exhaust port and which engages the cylinder block, an outer cover portion, and a main portion between the inner cover portion and the outer cover portion.

The invention also provides a method for relieving the exhaust back pressure in an outboard motor including a propeller shaft, and an internal combustion engine drivingly connected to the propeller shaft and including a cylinder block defining a cylinder with an exhaust port, and partially defining an exhaust chamber communicating with the exhaust port, and the engine including an exhaust cover mounted on the cylinder block and further defining the exhaust chamber, said method comprising the steps of removing the exhaust cover, and mounting on the cylinder block in place of the exhaust cover a housing defining an exhaust inlet communicating with the exhaust chamber, an exhaust outlet communicating with the atmosphere, and an expansion chamber communicating between said inlet and said outlet.

A principal feature of the invention is the provision of an exhaust system which reduces exhaust back pressure at the propeller, particularly at high speeds. This system preferably includes a muffler to reduce noise.

Another principal feature of the invention is the provision of a method for retrofitting a conventional outboard motor to provide the above-described exhaust system.

Another feature of the invention is the provision of a muffler located between the cylinder banks of a V-shaped cylinder block.

Other principal features and advantages of the invention will become apparent to those skilled in the art upon review of the following detailed description, claims and drawings.

BRIEF DESCRIPTION OF THE DRAWINGS

FIG. 1 is a side elevational view of a marine propulsion device embodying the invention.

FIG. 2 is a perspective, exploded view of the engine block and the muffler.

FIG. 7 is a sectional view taken along line 7—7 in FIG. 5.

FIG. 8 is a front elevational view of the main portion of the muffler.

FIG. 9 is a rear elevational view of the main portion of the muffler.

FIG. 10 is a sectional view taken along line 10—10 in FIG. 9.

FIG. 11 is a sectional view taken along line 11—11 in FIG. 9.

FIG. 12 is a bottom view of the main portion of the muffler.

FIG. 13 is a sectional view taken along line 13—13 in FIG. 12.

Figure 4:
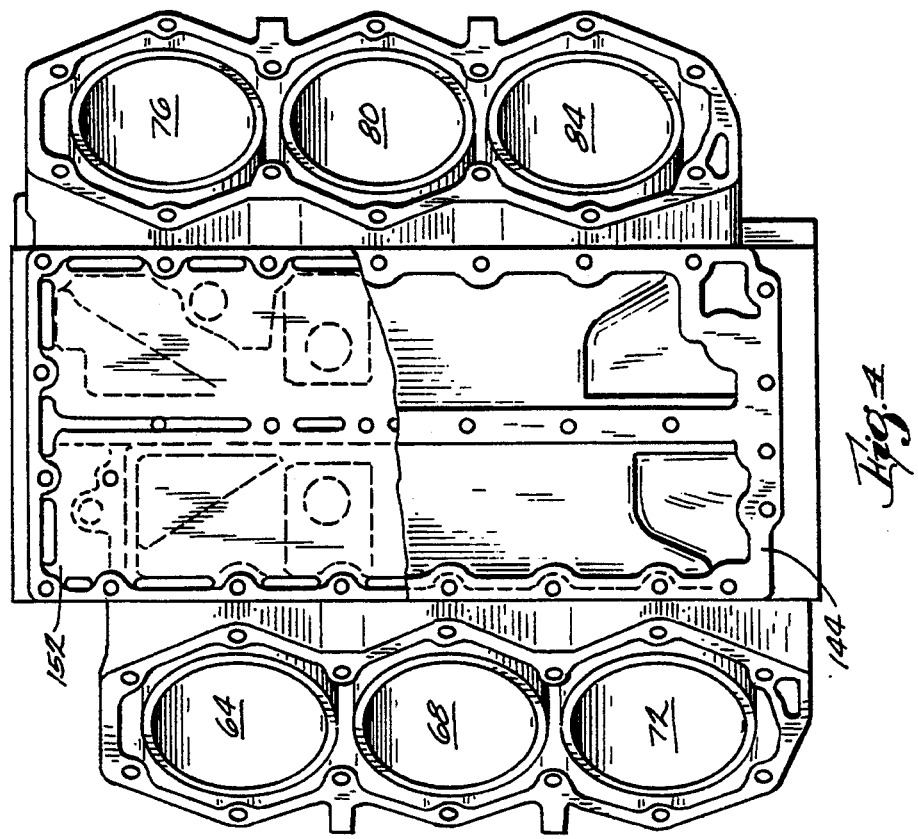
FIG. 4 is a partially broken-away rear elevational view of the engine block and the inner cover portion with the main portion of the muffler attached.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it should be understood that the phraseology and terminology used herein is for the purpose of description and should not be regarded as limiting.

DESCRIPTION OF THE PREFERRED EMBODIMENT

An outboard motor 4 embodying the present invention is illustrated in the drawings. The outboard motor 4 includes (see FIG. 1) a propulsion unit 8 mounted on a boat 9 for pivotal movement relative thereto about a horizontal tilt axis 10 and about a vertical steering axis 11. The propulsion unit 8 includes a driveshaft housing 12, a propeller shaft 16 supported by the driveshaft housing 12, and a propeller 20 supported by the propeller shaft 16. The propulsion unit 8 has therethrough an exhaust passageway 28 communicating between the upper end of the driveshaft housing 12 and an exhaust outlet 32 in the propeller 20. Such an exhaust arrangement is known in the art and will not be described in greater detail.

The propulsion unit 8 also includes an internal combustion engine 36 drivingly connected to the propeller shaft 16 and supported by the upper end of the driveshaft housing 12, as is known in the art. The internal combustion engine 36 includes (see FIG. 2) a V-shaped cylinder block 52 having a lower end which is supported by the driveshaft housing 12 and which has therein exhaust outlets 53 and 54 communicating with the exhaust passageway 28 in the driveshaft housing. The cylinder block 52 also has first and second or left and right cylinder banks 56 and 60. The left bank 56 of cylinders includes (see FIGS. 2 through 5) first, second and third cylinders 64, 68 and 72, and the right bank 60 of cylinders includes first, second and third cylinders 76, 80 and 84. The cylinders 64, 68, 72, 76, 80, and 84 (see FIGS. 2 and 3) include respective exhaust ports 88, 92, 96, 100, 104 and 108.

Figure 3:
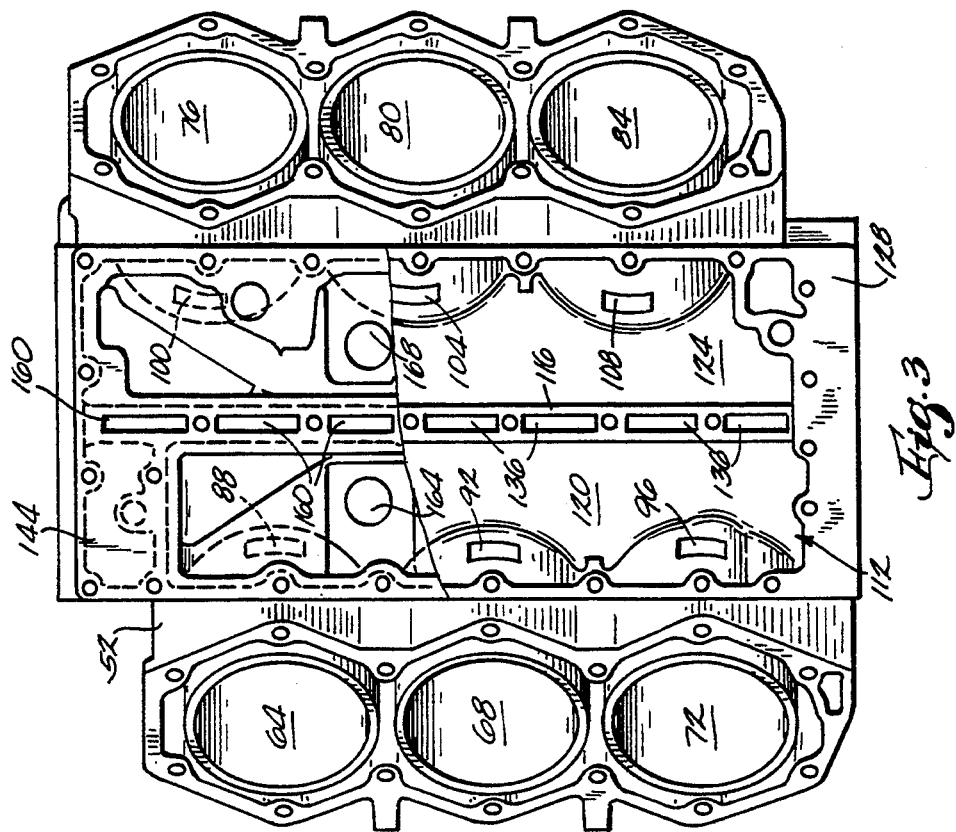
FIG. 3 is a partially broken-away rear elevational view of the engine block with the inner cover portion of the muffler attached.

The cylinder block 52 partially defines an exhaust chamber 112 which is located between the cylinder banks 56 and 60 and which communicates between the exhaust ports 88, 92, 96, 100, 104 and 108 and the exhaust outlets 53 and 54 in the lower end of the cylinder block 52. As illustrated in FIGS. 2, 3 and 7, the cylinder block 52 includes a wall 116 dividing the exhaust chamber 112 into first and second or left and right chamber portions 120 and 124. The left chamber portion 120 communicates between the exhaust ports 88, 92 and 96 and the exhaust outlet 53, and the right chamber portion 124 communicates with the exhaust ports 100, 104 and 108 and the exhaust outlet 54.

The cylinder block 52 also includes (see FIGS. 2, 3, 6 and 7) a rearwardly facing mounting surface 128 which surrounds the chamber portions 120 and 124 and which is partially defined by the wall 116. In a conventional outboard motor, the mounting surface 128 would have mounted thereon an exhaust cover (not shown) that would close the exhaust chamber portions 120 and 124 and that could define a water jacket. A conventional outboard motor can be retrofitted with the below-described muffler by removing this exhaust cover and replacing it with the below-described muffler.

The cylinder block 52 further includes (see FIGS. 6 and 7) a water jacket 132 having a portion located between the cylinder banks 56 and 60 and forwardly of the exhaust chamber 112. A plurality of water passageways 136 extend through the wall 116 from the mounting surface 128 to the water jacket 132.

Figure 6:
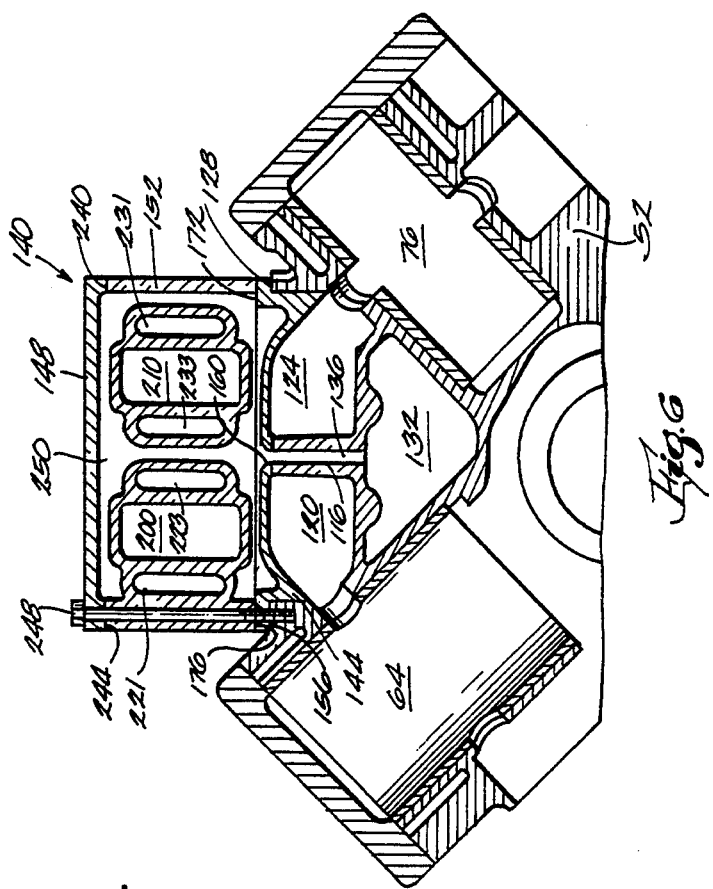
FIG. 6 is a sectional view taken along line 6—6 in FIG. 5.
Figure 5:
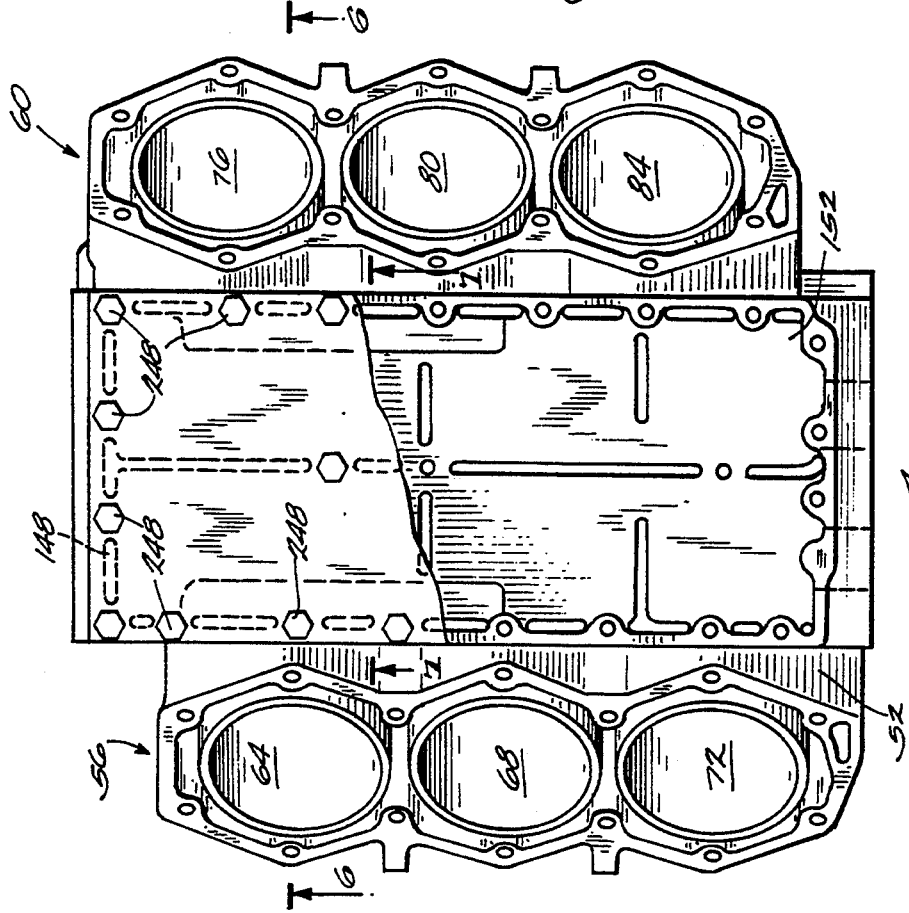
FIG. 5 is a partially broken-away rear elevational view of the engine block, the inner cover portion and the main portion of the muffler with the outer cover portion of the muffler attached.

The outboard motor 4 further comprises exhaust means located between the cylinder banks 56 and 60. The exhaust means is preferably formed separately from the cylinder block 52 and includes a muffler 140 mounted on the mounting surface 128. As shown in FIGS. 2, 6 and 7, the muffler 140 includes a housing comprised of an inner cover portion 144 engaging the cylinder block 52, an outer cover portion 148, and a main portion 152 between the inner cover portion 144 and the outer cover portion 148.

The inner cover portion 144 includes (see FIGS. 6 and 7) a forwardly facing mounting surface 156 complementary with and mating with the cylinder block mounting surface 128 so that the inner cover portion 144 further defines the exhaust chamber portions 120 and 124. The inner cover portion has therethrough a plurality of water passages 160 each communicating with a respective one of the water passageways 136 at the junction of the cylinder block mounting surface 128 and the inner cover mounting surface 156. As shown in FIG. 7, the inner cover portion 144 also has therethrough a first or left exhaust inlet passage 164 communicating with the left exhaust chamber portion 120 and a second or right exhaust inlet passage 168 communicating with the right exhaust chamber portion 124. The inner cover portion 144 also includes (see FIGS. 2, 6 and 7) a rearwardly facing mounting surface 172.

The main portion 152 of the housing includes (see Figs. 6–8) a forwardly facing mounting surface 176 complementary with and mating with the rearwardly facing mounting surface 156 of the inner cover portion 144. The mounting surface 176 has therein (see FIGS. 7 and 8) left and right exhaust inlet openings 180 and 184 respectively communicating with the left and right exhaust inlet passages 164 and 168 in the inner cover portion 144. The main portion 152 also includes a lower end having therein (see FIG. 13) left and right exhaust outlets 188 and 192.

As best shown in FIGS. 7 and 13, the main portion 152 defines an upper left expansion chamber 200 communicating with the left exhaust inlet opening 180, a middle left expansion chamber 202, and a lower left expansion chamber 204 communicating with the left exhaust outlet 188. The main portion 152 also defines an upper right expansion chamber 210 communicating with the right exhaust inlet opening 184, a middle right expansion chamber 212, and a lower right expansion chamber 214 communicating with the right exhaust outlet 192. The main portion 152 further defines an upper left restricted passageway 221 communicating between the upper left expansion chamber 200 and the middle left expansion chamber 202, and a lower left restricted passageway 223 communicating between the middle left expansion chamber 202 and the lower left expansion chamber 204. The main portion 152 further defines an upper right restricted passageway 231 communicating between the upper right expansion chamber 210 and the middle right expansion chamber 212, and a lower right restricted passageway 233 communicating between the middle right expansion chamber 212 and the lower right expansion chamber 214. Thus, the main portion 152 defines a plurality of expansion chambers communicating in series between each of the exhaust inlet openings 180 and 184 and the associated exhaust outlet 188 or 192, and restricted passageways communicating between adjacent expansion chambers. The main portion 152 also includes (see FIGS. 2, 6 and 9) a rearwardly facing mounting surface 240.

The outer cover portion 148 includes (see FIG. 6 and 7) a forwardly facing mounting surface 244 complementary with and mating with the rearwardly facing mounting surface 240 of the main portion 152. A plurality of bolts or screws 248 extending through the housing portions 144, 148 and 152 and into the cylinder block 52 secure the housing portions 144, 148 and 152 to the cylinder block 52.

The inner cover portion 144, the outer cover portion 148 and the main portion 152 cooperate to define (see FIGS. 6 and 7) a water jacket 250 surrounding the expansion chambers 200, 202, 204, 210, 212 and 214 and the restricted passageways 221, 223, 231 and 233. The water jacket 250 communicates with the cylinder block water jacket 132 via the water passages 160 in the inner cover portion 144.

The outboard motor 4 further comprises (see FIG. 1) a cowling 260 surrounding the engine 36. As is known in the art, the cowling 260 preferably includes an upper portion 264 and a lower portion 268.

The outboard motor 4 further comprises (see FIGS. 1 and 2) left and right exhaust conduits 270 and 274 extending through the lower portion 268 of the cowling 260. The left exhaust conduit 270 communicates between the left exhaust outlet 188 and the atmosphere, and the right exhaust conduit 274 communicates between the right exhaust outlet 192 and the atmosphere.

The exhaust system of the outboard motor 4 operates as follows. During normal operation, and when the exhaust back pressure at the propeller exhaust outlet 32 is relatively low, most exhaust gases from the cylinder exhaust ports travel through the exhaust chamber portions 120 and 124 to the exhaust passageway 28 in the driveshaft housing 12. These exhaust gases exit through the exhaust outlet 32 in the propeller 20. When exhaust back pressure at the propeller exhaust outlet 32 reaches a certain level, some of the exhaust gases from the cylinder exhaust ports flow from the exhaust chamber portions 120 and 124 into the muffler 140. As shown by the arrows in FIG. 13, the exhaust gases entering the left exhaust inlet passage 164 travel through the upper left expansion chamber 200, the upper left restricted passageway 221, the middle left expansion chamber 202, the lower left restricted passageway 223, the lower left expansion chamber 204, the left exhaust outlet 188 and the left exhaust conduit 270 to the atmosphere. The exhaust gases entering the right exhaust inlet passage 168 travel through the upper right expansion chamber 210, the upper right restricted passageway 231, the middle right expansion chamber 212, the lower right restricted passageway 233, the lower right expansion chamber 214, the right exhaust outlet 192, and the right exhaust conduit 274 to the atmosphere. Exhaust gas flow through the muffler 140 reduces the exhaust gas flow through the propeller 20 and thus reduces exhaust back pressure at the propeller exhaust outlet 32.

Various features of the invention are set forth in the following claims.

I claim:

1. An outboard motor comprising a propulsion unit including a driveshaft housing, a propeller shaft, and an internal combustion engine drivingly connected to said propeller shaft and including a V-shaped cylinder block supported by said driveshaft housing and having first and second cylinder banks including respective first and second cylinders having respective first and second exhaust ports, an exhaust passage cavity extending vertically between said cylinder banks, communicating with said exhaust ports, and being rearwardly open, and exhaust means located between said cylinder banks, closing said open exhaust passage cavity, and including a housing defining an expansion chamber, an exhaust inlet communicating between said expansion chamber and said exhaust passage cavity independently of said drive shaft housing, and an exhaust outlet communicating between said expansion chamber and the atmosphere without discharge of exhaust gas into said driveshaft housing.

2. The outboard motor of claim 1 wherein said exhaust means is formed separately from said cylinder block.

3. The outboard motor of claim 1 and further comprising a cowling surrounding said engine, and wherein said exhaust means also includes an exhaust conduit extending through said cowling and communicating between said exhaust outlet and the atmosphere.

4. The outboard motor of claim 3 wherein said cowling includes an upper portion and a lower portion, and wherein said exhaust conduit extends through said lower portion of said cowling.

5. The outboard motor of claim 1 wherein said cylinder block includes a wall dividing said exhaust passage cavity into first and second portions respectively communicating with said first and second exhaust ports, and wherein said housing defines first and second exhaust inlets respectively communicating with said first and second portions.

6. The outboard motor of claim 5 wherein said housing defines first and second exhaust outlets, a first expansion chamber communicating between said first inlet and said first outlet, and a second expansion chamber communicating between said second inlet and said second outlet.

7. The outboard motor of claim 1 wherein said housing also defines a water jacket surrounding said expansion chamber.

8. The outboard motor of claim 1 wherein said exhaust means includes an inner member, an outer member, and an intermediate member therebetween and having therein said exhaust outlet.

9. The outboard motor of claim 8 wherein said intermediate member defines said expansion chamber.

10. The outboard motor of claim 1 wherein said exhaust means comprises an intermediate member and an outer member defining a water jacket surrounding said expansion chamber.

11. The outboard motor of claim 1 wherein said housing defines a plurality of expansion chambers communicating in series between said exhaust inlet and said exhaust outlet.

12. The outboard motor of claim 11 wherein said housing also defines restricted passageways communicating between adjacent expansion chambers.

13. An outboard motor comprising a driveshaft housing, a propeller shaft supported by said driveshaft housing, an internal combustion engine drivingly connected to said propeller shaft and including a cylinder block which has a lower end supported by said driveshaft housing, which defines a cylinder having an exhaust port, and which includes an exhaust passage communicating with said exhaust port and having a side which is open, and a muffler located exteriorly of said driveshaft housing, communicating with said exhaust port independently of said driveshaft housing and including an inner member which closes said open side of said exhaust passage, an outer member, an intermediate member between said inner member and said outer member and at least partially defining an expansion chamber independently of said outer member, an exhaust inlet in said inner member communicating between said expansion chamber and said exhaust passage, and an exhaust outlet in communication between said expansion chamber and the atmosphere without passage of exhaust gas into said driveshaft housing.

14. The outboard motor of claim 13 wherein said cylinder block is V-shaped and has first and second cylinder banks, and wherein said muffler is located between said cylinder banks.

15. The outboard motor of claim 13 wherein said inner member, said intermediate member, and said outer member define a water jacket surrounding said expansion chamber.

16. An internal combustion engine including a crankshaft, a V-shaped cylinder block supporting said crankshaft and having first and second cylinder banks extending radially with respect to said crankshaft and including respective first and second cylinders having respective first and second exhaust ports, and exhaust means located between said cylinder banks and including an expansion chamber, an exhaust inlet communicating between said expansion chamber and said exhaust ports and including a restricted passage and an exhaust outlet communicating directly between said expansion chamber and the atmosphere for discharge of substantially all of the exhaust gas directly into the atmosphere, whereby said expansion chamber comprises the sole muffler between said cylinders and the atmosphere.

17. An internal combustion engine including a crankshaft, a V-shaped cylinder block supporting said crankshaft and having first and second cylinder banks extending radially with respect to said crankshaft and including respective first and second cylinders having respective first and second exhaust ports, an exhaust passage cavity extending between said cylinder banks in parallel relation to said crankshaft, communicating with said exhaust ports, and being rearwardly open, and exhaust means located between said cylinder banks, closing said open exhaust passage cavity, and including a housing defining an expansion chamber, an exhaust inlet communicating between said expansion chamber and said exhaust passage cavity, and an exhaust outlet communicating directly between said expansion chamber and the atmosphere for discharge of substantially all of the exhaust gas directly into the atmosphere.

* * * * *

UNITED STATES PATENT AND TRADEMARK OFFICE
CERTIFICATE OF CORRECTION

PATENT NO. : 5,374,209
DATED      : December 20, 1994
INVENTOR(S) : Jeffrey F. Wagner It is certified that error appears in the above-indentified patent and that said Letters Patent is hereby corrected as shown below:

On the cover page, add the following:

Assignee:   OUTBOARD MARINE CORPORATION
            Waukegan, Illinois

Signed and Sealed this

Fifteenth Day of August, 1995

Attest:

BRUCE LEHMAN

Attesting Officer      Commissioner of Patents and Trademarks